(12) United States Patent
Zu et al.

(10) Patent No.: US 10,658,913 B2
(45) Date of Patent: May 19, 2020

(54) LINEAR VIBRATION MOTOR

(71) Applicant: GOERTEK INC., WeiFang, Shandong (CN)

(72) Inventors: Fenglei Zu, WeiFang (CN); Chungfa Liu, WeiFang (CN)

(73) Assignee: GOERTEK INC., WeiFang, Shandong (CN)

( * ) Notice: Subject to any disclaimer, the term of this patent is extended or adjusted under 35 U.S.C. 154(b) by 65 days.

(21) Appl. No.: 15/750,545

(22) PCT Filed: Dec. 15, 2015

(86) PCT No.: PCT/CN2015/097466
§ 371 (c)(1),
(2) Date: Feb. 6, 2018

(87) PCT Pub. No.: WO2017/049778
PCT Pub. Date: Mar. 30, 2017

(65) Prior Publication Data
US 2018/0241294 A1 Aug. 23, 2018

(30) Foreign Application Priority Data

Sep. 23, 2015 (CN) .......................... 2015 1 0613760

(51) Int. Cl.
*H02K 33/18* (2006.01)
*B06B 1/04* (2006.01)
(Continued)

(52) U.S. Cl.
CPC ............. *H02K 33/18* (2013.01); *B06B 1/045* (2013.01); *H02K 33/14* (2013.01); *H02K 33/16* (2013.01); *H02K 35/02* (2013.01)

(58) Field of Classification Search
CPC ........ H02K 33/00; H02K 33/18; H02K 33/14; H02K 33/16; H02K 35/02; B06B 1/045
See application file for complete search history.

(56) References Cited

U.S. PATENT DOCUMENTS

| 7,429,808 B2* | 9/2008 | Lehr | F16C 29/02 |
| | | | 310/12.04 |
| 8,334,624 B2* | 12/2012 | Dong | H02K 33/16 |
| | | | 310/13 |
| 8,624,449 B2* | 1/2014 | Kim | H02K 33/18 |
| | | | 310/25 |

(Continued)

FOREIGN PATENT DOCUMENTS

| CN | 101488697 A | 7/2009 |
| CN | 201577016 U | 9/2010 |

(Continued)

OTHER PUBLICATIONS

International Search Report and Written Opinion, State Intellectual Property Office of the P.R. China, dated Jun. 28, 2016.

(Continued)

*Primary Examiner* — Burton S Mullins
(74) *Attorney, Agent, or Firm* — Holzer Patel Drennan

(57) ABSTRACT

A linear vibration motor comprising a vibrator and a stator, wherein the vibrator comprises at least two permanent magnets disposed adjacent to each other and a magnetic yoke disposed between any two adjacent permanent magnets, and adjacent ends of the two adjacent permanent magnets have the same polarities; the stator comprises coils and magnetic cores disposed in the coils; magnetization directions of the permanent magnets are perpendicular to axis directions of the coils. The linear vibration motor enables the magnetic lines of flux of the permanent magnets to intensively pass through the coils by means of a repulsive force between two ends with same polarity of two permanent magnets so as to obtain a larger magnetic flux and a stronger vibration sensing effect.

8 Claims, 5 Drawing Sheets

(51) Int. Cl.
*H02K 35/02* (2006.01)
*H02K 41/03* (2006.01)
*H02K 33/00* (2006.01)
*H02K 33/16* (2006.01)
*H02K 33/14* (2006.01)

(56) References Cited

U.S. PATENT DOCUMENTS

| | | | |
|---|---|---|---|
| 9,614,425 B2* | 4/2017 | Jin | H02K 33/16 |
| 10,033,257 B2* | 7/2018 | Zhang | H02K 33/12 |
| 10,063,128 B2* | 8/2018 | Wang | H02K 33/16 |
| 2010/0291813 A1 | 1/2010 | Kotlyar | |
| 2015/0123500 A1* | 5/2015 | Jung | H02K 33/18 310/25 |
| 2016/0254736 A1* | 9/2016 | Jin | H02K 33/16 310/25 |
| 2017/0070131 A1* | 3/2017 | Degner | H02K 33/16 |

FOREIGN PATENT DOCUMENTS

| | | | | |
|---|---|---|---|---|
| CN | 201639462 U | 11/2010 | | |
| CN | 102570764 A | 7/2012 | | |
| CN | 205092752 U | 3/2013 | | |
| CN | 103401395 A | 11/2013 | | |
| CN | 103762815 A | * 4/2014 | | H02K 33/16 |
| CN | 102684445 A | 9/2015 | | |
| JP | H08116658 A | 5/1996 | | |
| KR | 20110027173 A | 3/2011 | | |

OTHER PUBLICATIONS 201510613760.4, Office Action, State Intellectual Property Office of the P.R. China, dated Apr. 1, 2017.

* cited by examiner

LINEAR VIBRATION MOTOR

TECHNICAL FIELD

The present application relates to technical field of consumer electronics, and more particularly relates to a linear vibration motor used in portable consumer electronics products.

BACKGROUND

With the development of communication technology, portable electronic products such as mobile phones, handheld game machines or handheld multimedia entertainment apparatus enter people's lives. In these portable electronic products, micro-vibration motors are generally used to make system feedbacks, such as mobile phone notifications on incoming calls, game machine vibration feedbacks and the like. However, with the development trend of thin and lightweight electronic products, a variety of internal components thereof also need to adapt to this trend, and the micro-vibration motor is no exception.

Existing micro-vibration motors generally comprise an upper cover, a lower cover which forms a vibration space with the upper cover, a vibrator (including a counterweight and a permanent magnet) performing a linear reciprocating vibration in the vibration space, an elastic support connecting to the upper cover and driving the vibrator to perform a reciprocating vibration, and a coil positioned a distance below the vibrator.

In a micro-vibration motor having the above-described structure, the permanent magnet and the coil are placed perpendicularly to each other, i.e., the direction of magnetization of the permanent magnet is parallel to the axis direction of the coil, so that the magnetic lines of flux of the permanent magnet can perpendicularly pass through the coil to make the magnetic field of the permanent magnet to be utilized as much as possible. However, in a micro-vibration motor having the above-described structure, the magnetic lines of flux generated by the permanent magnet itself in the vibrator are relatively dispersed; thus the generated magnetic fields are still not adequately utilized, and correspondingly the magnetic flux passing through the coil will be relatively small, so that the acting force will be relatively small and thus affect the vibration sensing effect. When the vibrator moves to two ends, the magnetic flux passing through the voice coil in the vertical magnetization direction is also very small, thus making the vibration sensing and the linear vibration response speed of the electronic products slow and the vibration sensing small.

SUMMARY

In view of the above problems, the purpose of the present application is to provide a linear vibration magnetizing motor which enables magnetic lines of flux of permanent magnets to intensively pass through a coil by means of a repulsive force between two ends with same polarity of two permanent magnets so as to obtain a larger magnetic flux and a stronger vibration sensing effect.

The linear vibration motor provided by the present application comprises a vibrator and a stator, wherein the vibrator comprises at least two permanent magnets disposed adjacent to each other and a magnetic yoke disposed between any two adjacent permanent magnets, and adjacent ends of two adjacent permanent magnets have the same polarities, and the stator comprises a coil and a magnetic core disposed in the coil, and a magnetization direction of the permanent magnets is perpendicular to an axis direction of the coil.

The preferred technical solution is that the magnetic yokes and the magnetic cores are misaligned.

The vibrator further comprises a counterweight, an avoidance structure for avoiding the stator provided in the middle of the counterweight, and a groove for accommodating the permanent magnets and the magnetic yokes provided at a central position of the avoidance structure on the counterweight.

In the linear vibration motor, a preferred technical solution is that a horizontal distance between the magnetic yoke and the magnetic core corresponding to the magnetic yoke is within a numerical range of 0.1 mm to 0.3 mm.

In the linear vibration motor, a preferred technical solution is that the stator and the vibrator are arranged in a vertical direction, and a vibration direction of the vibrator is parallel to a plane in which the stator is installed.

In the linear vibration motor, a preferred technical solution is that the vibrator comprises three permanent magnets, and one magnetic yoke is provided between any two adjacent permanent magnets, and the stator comprises two coils disposed corresponding to the vibrator and magnetic cores disposed in the coils respectively, and the magnetic yokes and the magnetic cores are arranged alternately, and the two magnetic cores are arranged at positions where the magnetic yokes corresponding to the magnetic cores are far away from a center of the vibrator.

In the linear vibration motor, a preferred technical solution is that the magnets and the magnetic yoke are fixed in the groove in manner of glue coating or laser welding after the magnets and the magnetic yoke are integrally fixed.

In the linear vibration motor, a preferred technical solution is that vibration guide shafts, limiting springs and limiting blocks are disposed at two ends of the counterweight respectively, and the limiting springs are sleeved on the vibration guide shafts and the positions of the limiting springs are restricted between the counterweight and the limiting blocks, and guide holes for reciprocating movements of the vibration guide shafts are provided in the limiting blocks, and shaft sleeves are sleeved at one end of the vibration guide shafts which penetrate into the guide holes.

In the linear vibration motor, a preferred technical solution is that the linear vibration motor further comprises a housing, wherein the vibration guide shafts are fixedly connected with the counterweight, and the limiting blocks are fixedly connected with the housing, or the vibration guide shafts are fixedly connected with the housing, and the limiting blocks are fixedly connected with the counterweight.

In the linear vibration motor, a preferred technical solution is that the counterweight is a tungsten steel block, a nickel steel block or a nickel-tungsten alloy block.

In the above-described linear vibration motor according to the present application, instead of the conventional design of a motor in which permanent magnets and coils are placed perpendicularly to each other, the permanent magnets of the vibrator are horizontally placed such that the magnetization direction of the permanent magnets is perpendicular to the axial direction of the coil, and the vibration direction of the vibrator is parallel to the plane where the stator is located, and the adjacent ends of the adjacent permanent magnets have the same polarity. Thereby the magnetic lines of flux of the permanent magnets are gathered by means of the repulsion force of the same polarity, so that the stator can obtain a magnetic flux as large as possible, and the upper and lower parallel arrangement of the stator and the vibrator also effectively reduces the size of the motor and further facilitates the miniaturization of the motor.

In order to achieve the above and related purposes, one or more aspects of the present application comprise the features that will be described below in detail and particularly set forth in claims. The following description and drawings illustrate in detail certain illustrative aspects of the present application. However, these aspects are merely some of the various ways in which the principles of the present application can be employed. In addition, the present application is intended to comprise all such aspects and their equivalents.

BRIEF DESCRIPTIONS OF THE DRAWINGS

The other purposes and results of the present application will become more apparent and more readily appreciated through the following descriptions in connection with the accompanying drawings and contents of claims, along with more fully understood of the present application.

Figure 1:
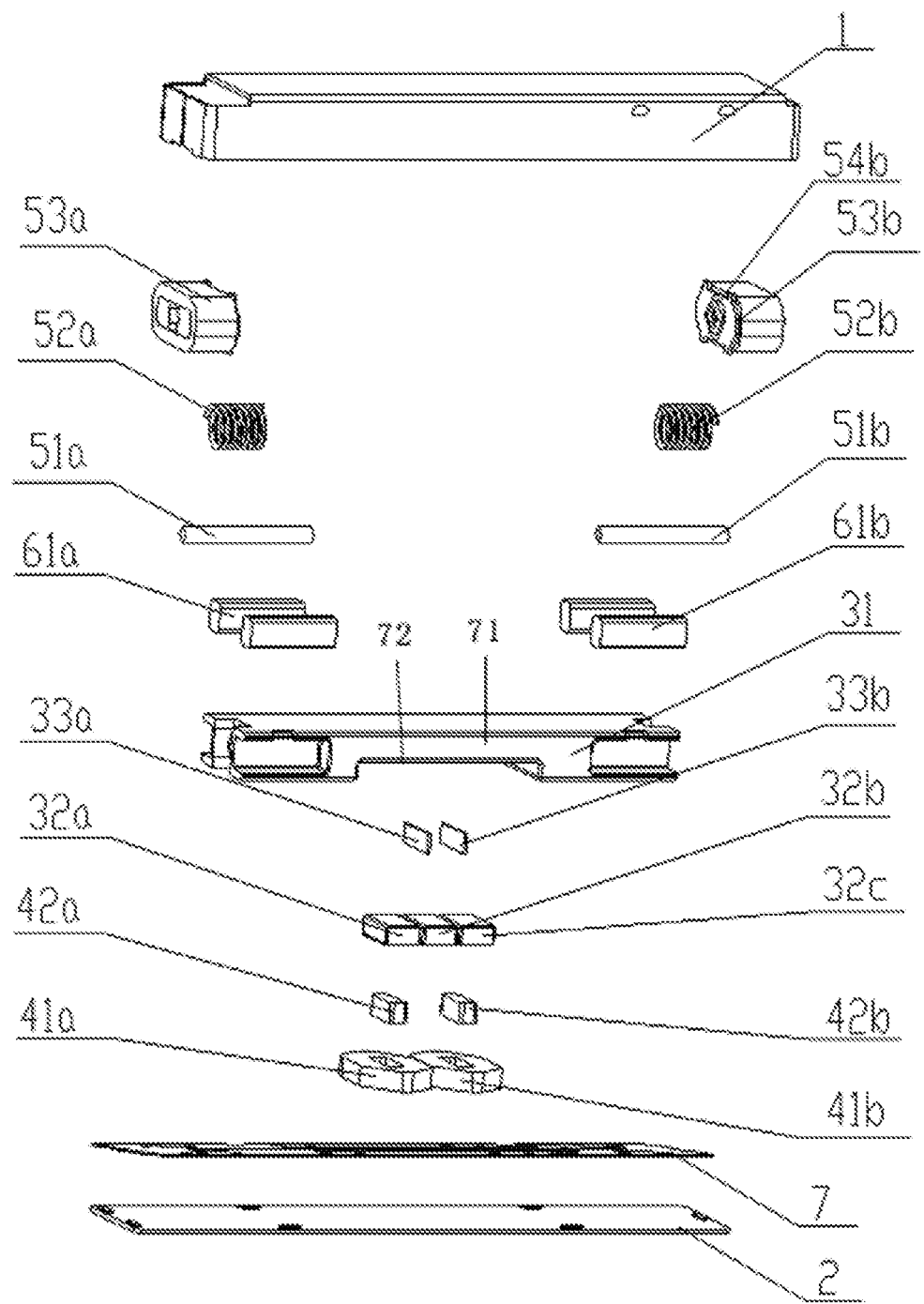
FIG. 1 is a schematic drawing of an overall exploded structure of a linear vibration motor according to an embodiment of the present application.

In the drawings, upper case 1, rear cover 2, counterweight 31, permanent magnet 32a, 32b, 32c, 32a' and 32b', magnetic yoke 33a, 33b and 33a', coil 41a, 41b and 41', magnetic core 42a, 42b, 42', vibration guide shaft 51a, 51b, limiting spring 52a, 52b, limiting block 53a, 53b, shaft sleeve 54a, 54b, flexible circuit board 7, and balance magnet 61a, 61b are depicted.

The same reference numbers indicate similar or corresponding features or functions in all of the drawings.

DETAILED DESCRIPTION

In the following description, for the purposes of illustration, numerous specific details are explained in order to provide a thorough understanding of one or more embodiments. However, it is apparent that these embodiments can be implemented without these specific details. In other examples, well-known structures and apparatus are illustrated in the form of block diagram in order to facilitate describing one or more embodiments.

The "counterweight" used in the present application for describing the particular embodiments may also be referred to as a "mass", both of which refer to a metal block with high-quality and high-density that is fixed to a permanent magnet generating vibration to enhance vibration balance.

The specific embodiments of the present application will be described in detail in combination with the accompanying drawings in the following.

In order to solve the problem of dispersion of the the magnetic lines of flux due to the vertical arrangement of the permanent magnet and the coil in the structure of existing micro-vibration motors, the present application provides a linear vibration motor in which the permanent magnets in the vibrator are disposed approximately horizontally while the stator is disposed parallel to the vibrator. That is to say, in the linear vibration motor of the present application, the vibrator comprises at least two permanent magnets disposed adjacent to each other, and adjacent ends of the two adjacent permanent magnets have the same polarity, and a magnetization direction of the permanent magnets is perpendicular to an axis direction of the coil in the stator.

Figure 2:
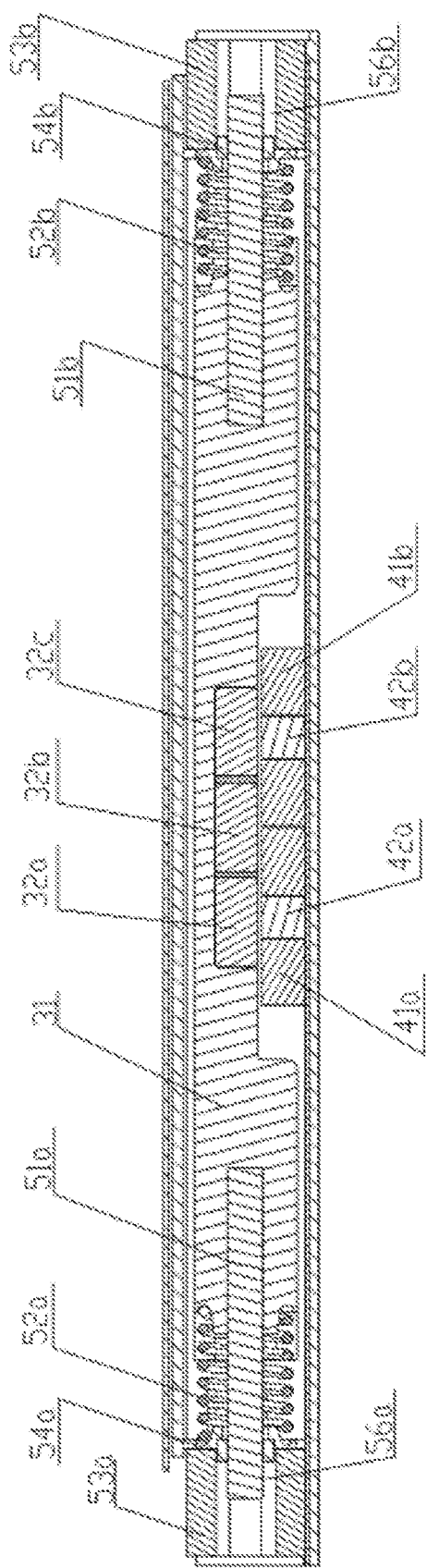
FIG. 2 is a schematic drawing of a combination structure of a linear vibration motor according to an embodiment of the present application.

In particular, FIGS. 1 and 2 show an overall exploded structure and a combination structure of a linear vibration motor according to an embodiment of the present application, respectively.

As shown by FIG. 1 and FIG. 2 together, the linear vibration motor of the present embodiment mainly comprises a housing, a vibrator and a stator, and the stator and the vibrator are arranged in a vertical direction. In the linear vibration motor, the housing comprises a upper case 1 and a rear cover 2. The vibrator comprises a counterweight 31 and a vibrating block consisting of three permanent magnets 32a, 32b and 32c disposed adjacent to each other and two magnetic yokes 33a, 33b disposed between the adjacent permanent magnets respectively. The stator comprises two coils 41a, 41b disposed corresponding to the vibrator and magnetic cores 42a, 42b disposed in the coils respectively. The magnetic yokes and the magnetic cores are arranged alternately, and each of the magnetic cores is arranged at a position where the magnetic yoke corresponding to the magnetic core is far away from a center of the vibrator. The "corresponding" refers to a magnetic core and a magnetic yoke which can influence each other and change a direction of magnetic lines of flux. In the illustration, the magnetic yokes and the magnetic cores are alternately arranged in an order of the magnetic core 42a, the magnetic yoke 33a, the magnetic yoke 33b and the magnetic core 42b, wherein the magnetic core 42a corresponds to the magnetic yoke 33a, and the magnetic yoke 33b corresponds to the magnetic core 42b.

Figure 3A:
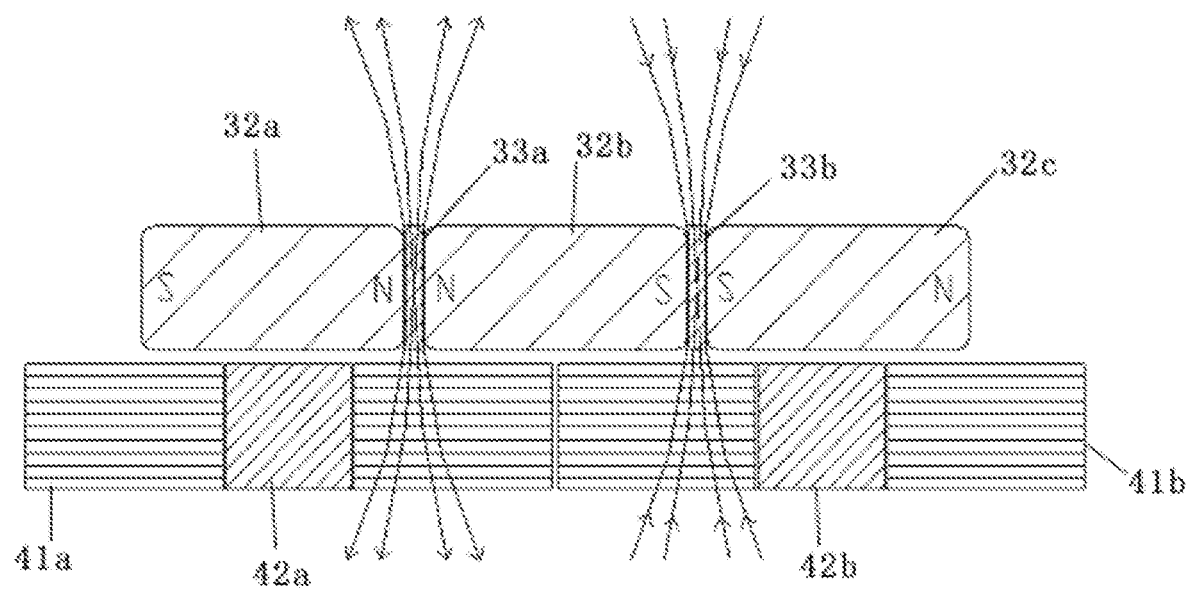
FIGS. 3a and 3b are schematic drawings of a combination structure of a vibrating block and a stator according to an embodiment of the present application respectively.
Figure 3B:
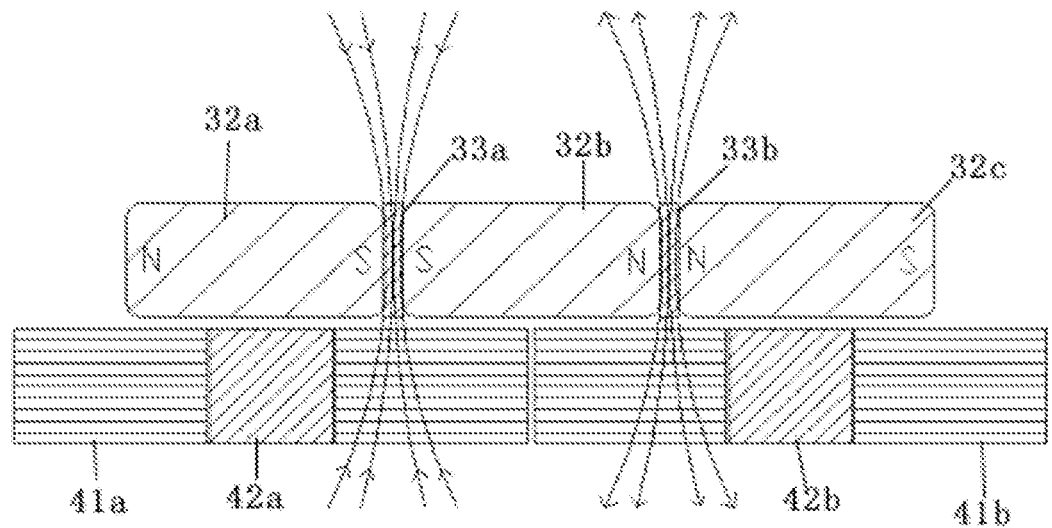

The combination structure of the vibrating block and the stator are illustrated in FIG. 3a and FIG. 3b. Three permanent magnets are disposed adjacent to each other; each of the permanent magnets has a same polarity as an adjacent end of an adjacent permanent magnet, i.e., the permanent magnets are arranged in the order of S-N, N-S and S-N (as shown in FIG. 3a) or N-S, S-N and N-S (as shown in FIG. 3b), the magnetic yokes are disposed between the adjacent permanent magnets, and a magnetization direction of the permanent magnets is perpendicular to an axis direction of the coils of the stator. Herein, the axis direction of the coil is a direction in which a central axis of the coil and the magnetic core in the coil are located. In the embodiment shown in FIG. 3a and FIG. 3b, the magnetization direction of the magnets is a horizontal direction, and the axis direction of the coils is a vertical direction. Since a repulsive force will be generated between two adjacent ends with same polarity of two permanent magnets, the magnetic lines of flux of the permanent magnets can intensively pass through the magnetic yokes between two adjacent permanent magnets and the coils arranged below the vibrating block, so as to increase the magnetic flux passing through the coil as much as possible.

Figure 4:
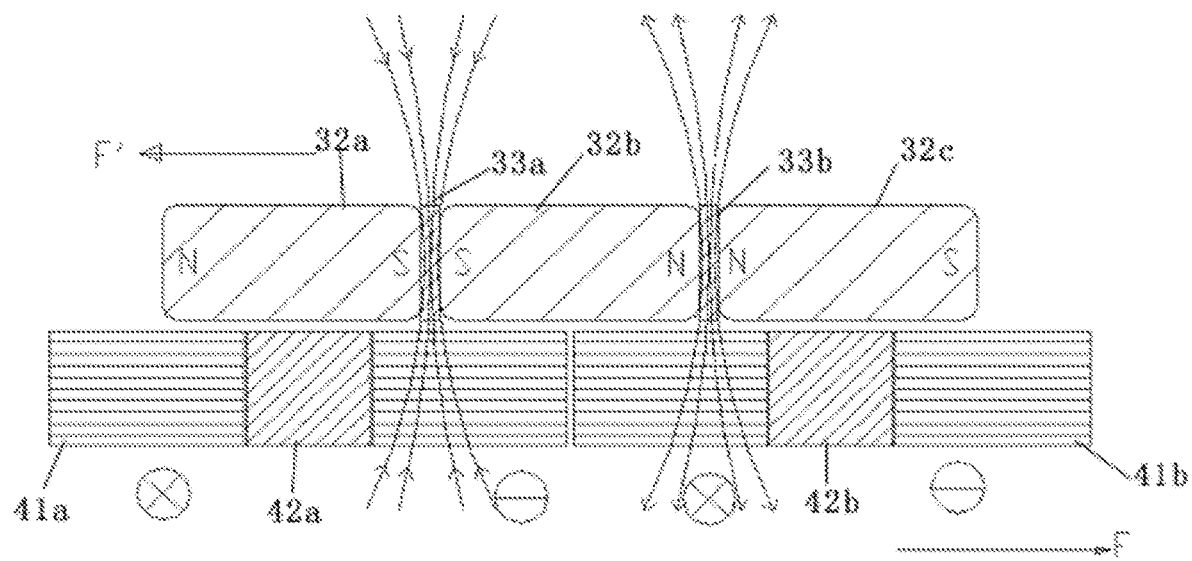
FIG. 4 is a schematic drawing of an operating principle according to an embodiment of the present application.

In the following, the operation principle of the linear vibration motor of the present application will be briefly described by taking FIG. 4 as an example. According to a left hand rule that determines a force direction of an energized conductor in a magnetic field, when a left hand is stretched out with the thumb perpendicular to the remaining four fingers, and the left hand and the thumb are in the same plane with the palm, an imaginary line representing a magnetic induction line enters into the center of the palm, the four fingers point the direction of the current, and the thumb points the direction of the ampere force applied to the energized wire in the magnetic field. The direction of the current in the coil in FIG. 4 is assumed as follows: the current direction indicated as "⊖" in the drawing is into and perpendicular to the paper, and the current direction indicated as "⊗" in the drawing is out from and perpendicular to the paper. When the current direction of the first coil is indicated as "⊗ and ⊖", the current direction of the second coil must also be "⊗ and ⊖"; thus, all of the coils are subject to a force F towards the right. Because the coils are stationary, the permanent magnets are subject to a force F' towards the left according to the relationship between the force and the reaction force. In this way, the permanent magnets undertaking a pushing force towards the left will bring the counterweight together to perform a leftward translational movement, to compress the spring on the left side of the counterweight and to stretch the spring on the right side of the counterweight. Similarly, when the current direction changes, the direction of the magnetic field force F applied to the coils is leftward, according to the left hand rule. However, since the coils are stationary, the permanent magnet are subjected to the acting force F' whose direction is opposite to the force F and magnitude is the same as the force F, and the permanent magnets, undertaking a pushing force towards the right, will bring the counterweight together to perform a rightward translational movement. Meanwhile, the springs on the two ends of the counterweight continue to be stretched after returning to the original state from the stretched state. Alternately, the vibrator comprising the counterweight and the vibrating block consisting of the permanent magnets and the magnetic yokes has a reciprocating movement in a direction parallel to a plane in which the stator is installed.

Figure 5A:
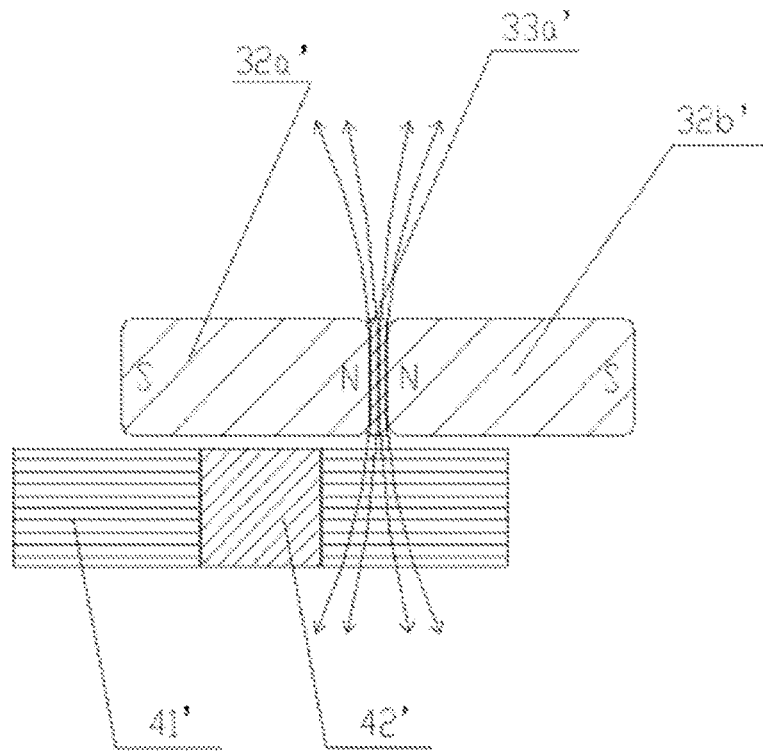
FIG. 5a and FIG. 5b are schematic drawings of a combination structure of a vibrating block and a stator according to another embodiment of the present application respectively.
Figure 5B:
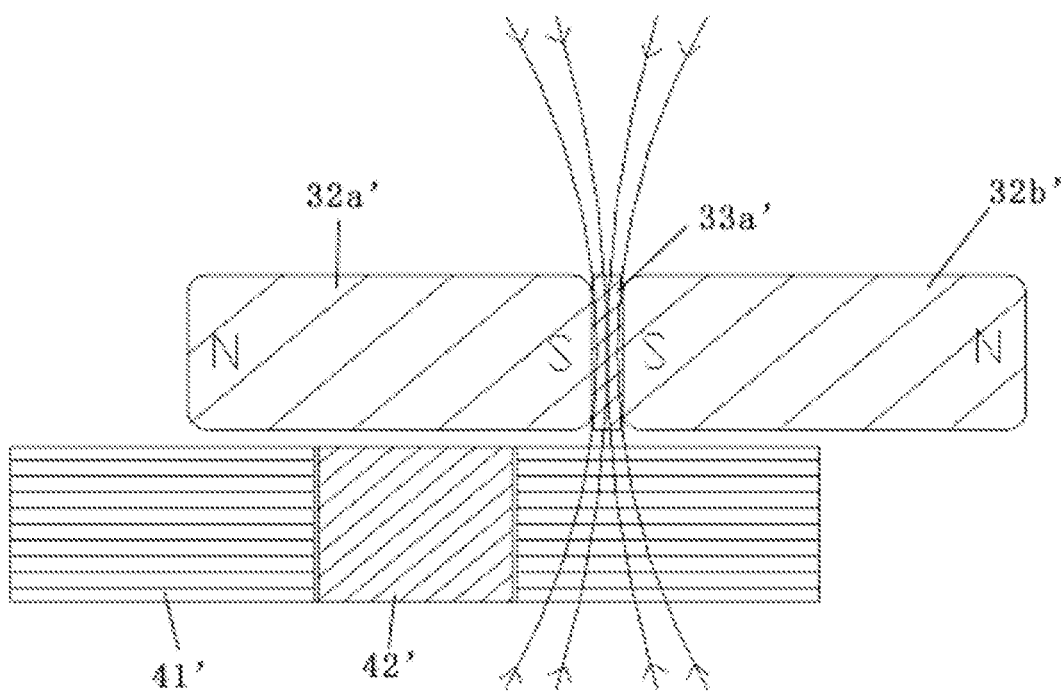

In the above-described embodiment, the vibrating block comprises three permanent magnets; however, it is not limited to the above-described structure in the particular application, and the number of permanent magnets constituting the vibrating block can also be appropriately selected according to the magnitude of the vibration force necessary for the application products, such as more permanent magnets or a combination structure of a vibrating block consisting of two permanent magnets and a stator shown in FIGS. 5a and 5b, respectively.

As shown in FIG. 5a and FIG. 5b, the vibrating block comprises two permanent magnets 32a', 32b' disposed adjacent to each other, and the adjacent ends of the two permanent magnets have the same polarity. A magnetic yoke 33a' is provided between the two permanent magnets 32a', 32b' and a stator consisting of a coil 41' and a magnetic core 42' arranged in the coil 41' is provided below the vibrating block, wherein the magnetic yoke 33a' and the magnetic core 42' are arranged alternately.

In the embodiment shown in FIG. 1 and FIG. 2, the vibrating block is embedded and fixed in the counterweight to cause the counterweight to vibrate horizontally. In particular, an avoidance structure 71 for avoiding the stator is provided in the middle of the counterweight, and a groove 72 for accommodating the vibrating block is provided at a central position of the avoidance structure on the counterweight. In the specific assembly process, the operator may first fix the permanent magnet and the magnetic yoke constituting the vibrating block together, then fix the whole vibrating block in the groove by glue coating or laser welding or the like.

In addition, the linear vibration motor of the present application further comprises two vibration guide shafts 51a and 51b, limiting springs 52a, 52b and limiting blocks 53a, 53b disposed at two ends of the counterweight 31. The limiting springs are sleeved on the vibration guide shafts 51a, 51b. In the embodiment shown in FIG. 1 and FIG. 2, the limiting blocks 53a and 53b are respectively fixed on the upper case 1, and the two vibration guide shafts 51a and 51b are respectively fixed on two ends of the counterweight 31, and the limiting blocks 53a and 53b are further provided with a guide hole 56a for reciprocating movements of the vibration guide shaft. In this way, the vibrating block causes the counterweight 31 and the vibration guide shafts 51a and 51b fixed at two ends of the counterweight 31 to vibrate within a range defined by the guide hole 56a, under the action of the magnetic field generated by the stator after the stator is energized.

The limiting springs 52a and 52b respectively sleeved on the vibration guide shafts 51a and 51b are respectively restricted between the counterweight 31 and the corresponding limiting blocks 53a and 53b so as to provide elastic restoring force for the vibration of the vibrator.

In addition, in order to reduce the friction between the vibration guide shaft and the guide hole as much as possible to improve product quality, it is also possible to sleeve shaft sleeves 54a, 54b at the end of the guide shaft penetrating the guide hole, and the contact surface of the shaft sleeve and the guide hole is smooth and wear-resistant. By means of incorporating the shaft sleeve, the contact area between the vibration guide shaft and the guide hole is reduced, and the shaft sleeve can be manufactured by utilizing a material with a high density and a smooth wear-resistant surface, so as to be capable of reducing the friction between the vibration guide shaft and the guide hole as much as possible and improving the degree of lubrication without increasing the cost.

As another embodiment of the present application, it also possible to fix the limiting blocks to two ends of the counterweight respectively or design the counterweight and the limiting blocks to be an integrated structure, and arrange guide holes for reciprocating movements of the vibration guide shaft on the limiting blocks, and fix the two vibration guide shafts to the upper case respectively, and sleeve the shaft sleeve on the end of the guide shaft which has effect on the guide hole (herein the end closer to the counterweight). In this way, the vibrating block brings the counterweight and the limiting blocks fixed at two ends of the counterweight to vibrate along the vibration guide shaft within a limited range of the guide hole, under the action of the magnetic field generated by the stator, after the stator is energized.

Obviously, the vibration amplitude of the vibrator determines the depth that the vibration guide shafts penetrate into the guide holes, the depth that the end of the vibration guide shafts which penetrate into the guide holes distance from the bottom of the guide holes, and the width that the edge of the avoidance structure distance from the outer edge of the stator. In the embodiments shown in FIG. 1, FIG. 2, and FIG. 3a, FIG. 3b, a horizontal distance between the magnetic yoke and the magnetic core corresponding to the magnetic yoke is within a numerical range of 0.1 mm-0.3 mm; that is, the horizontal distance from the center line of each magnetic yoke to the center line of the magnetic core of the corresponding (i.e., closest) stator is 0.1-0.3 mm. Thus, the vibration guide shaft extends into the guide hole, the distance from the end of the vibration guide shaft to the bottom of the guide hole, and the distance from the edge of the avoidance structure to the outer edge of the stator should be slightly larger than 0.2 mm.

The counterweight 31 can be manufactured by utilizing a high-density metal material such as tungsten steel block or nickel steel block or nickel-tungsten alloy, to increase the vibration force and make the vibration of the electronic product stronger.

In addition, the linear vibration motor provided by the present application further comprises a flexible circuit board (PFCB) 7, and the stator is fixed on the FPCB 7, and a coil lead of the stator communicates with an external circuit through a circuit on the FPCB 7, wherein the FPCB 7 is fixed to the upper case 1 and the rear cover 2 can be fixed to the FPCB 7 by snap-fitting.

In order to provide a stable magnetic balance guide for the motor, the present application may be further provided with a magnetic balance guide mechanism. The magnetic balance guide mechanism comprises a pair of balance magnets 61a and 61b respectively disposed on vertical sidewalls on two ends of the counterweight 31.

The linear vibration motor according to the present application is described by way of example with reference to the accompanying drawings. However, those skilled in the art should understand that various modifications may be made to the linear vibration motor according to the above-described present application without departing from the scope of the present application. Therefore, the protection scope of the present application should be determined by the contents of the appended claims.

What is claimed is:

1. A linear vibration motor comprising a vibrator and a stator, wherein,
   the vibrator comprises three permanent magnets disposed adjacent to each other and a magnetic yoke disposed between any two adjacent permanent magnets, and adjacent ends of two adjacent permanent magnets have the same polarities;
   the stator comprises two coils disposed corresponding to the vibrator and two magnetic cores disposed in the coils, respectively; and
   a magnetization direction of the permanent magnets is perpendicular to an axis direction of the coil,
   wherein the magnetic yoke and the magnetic cores are arranged alternately, and the two magnetic cores are arranged at positions removed from the positions of the magnetic yoke corresponding to the magnetic cores along a direction away from a center of the vibrator.

2. The linear vibration motor according to claim 1, wherein a horizontal distance between the magnetic yoke and one of the magnetic cores is within a range of 0.1 mm to 0.3 mm.

3. The linear vibration motor according to claim 1, wherein the stator and the vibrator are arranged in a vertical direction, and a vibration direction of the vibrator is parallel to a plane in which the stator is installed.

4. The linear vibration motor according to claim 1, wherein,
   vibration guide shafts, limiting springs and limiting blocks are disposed at two ends of the counterweight respectively, and the limiting springs are sleeved on the vibration guide shafts and the positions of the limiting springs are restricted between the counterweight and the limiting blocks;
   guide holes for reciprocating movements of the vibration guide shafts are provided in the limiting blocks; and
   shaft sleeves are sleeved at one end of the vibration guide shafts which penetrate into the guide holes.

5. The linear vibration motor according to claim 4, further comprising a housing,
   wherein the vibration guide shafts are fixedly connected with the counterweight, and the limiting blocks are fixedly connected with the housing, or
   the vibration guide shafts are fixedly connected with the housing, and the limiting blocks are fixedly connected with the counterweight.

6. The linear vibration motor according to claim 1, wherein, the vibrator further comprises a counterweight,
   wherein an avoidance structure for avoiding the stator is provided in the middle of the counterweight; and
   a groove for accommodating the permanent magnets and the magnetic yoke is provided at a central position of the avoidance structure on the counterweight.

7. The linear vibration motor according to claim 6, wherein,
   the permanent magnets and the magnetic yoke are fixed in the groove by glue coating or laser welding after the permanent magnets and the magnetic yoke are integrally fixed.

8. The linear vibration motor according to claim 6, wherein, the counterweight is a tungsten steel block, a nickel steel block or a nickel-tungsten alloy block.

* * * * *